United States Patent [19]

Matsuura

[11] Patent Number: 4,565,254

[45] Date of Patent: Jan. 21, 1986

[54] MEASURING APPARATUS

[75] Inventor: Yoshikazu Matsuura, Tokyo, Japan

[73] Assignee: Teraoka Seiko Co., Ltd., Tokyo, Japan

[21] Appl. No.: 528,270

[22] Filed: Aug. 31, 1983

[30] Foreign Application Priority Data

| Aug. 31, 1982 [JP] | Japan | 57-152030 |
| Aug. 31, 1982 [JP] | Japan | 57-132531[U] |
| Jun. 30, 1983 [JP] | Japan | 58-118727 |

[51] Int. Cl.⁴ .................... G01G 19/14; G01G 19/22; G01G 23/14
[52] U.S. Cl. .................... 177/25; 177/147; 177/164; 177/50
[58] Field of Search ............ 177/1, 25, 50, 58, 147, 177/164; 73/1 B

[56] References Cited

U.S. PATENT DOCUMENTS

| 3,339,651 | 9/1967 | Garnett | 177/58 X |
| 4,465,149 | 8/1984 | Kawashima et al. | 177/25 X |
| 4,466,500 | 8/1984 | Mosher et al. | 177/1 |
| 4,467,881 | 8/1984 | Kitagawa | 177/50 |

FOREIGN PATENT DOCUMENTS

| 3139201 | 4/1983 | Fed. Rep. of Germany | 73/1 B |
| 987405 | 1/1983 | U.S.S.R. | 177/58 |

Primary Examiner—E. A. Goldberg
Assistant Examiner—Patrick W. Foster
Attorney, Agent, or Firm—Watson Cole Grindle & Watson

[57] ABSTRACT

A measuring apparatus includes a plurality of measuring hoppers combined, and measuring means for measuring product to be measured accommodated in the respective measuring hoppers to select a set of a plurality of measured values equal or near to a set weight so as to permit the product of the selected measured values to be exhausted from the hoppers. This invention is intended to improve such a measuring apparatus, particularly a span adjusting mechanism provided at each of a plurality of the measuring hopper by raising or lowering all reference weights at one time. Moreover, the measuring apparatus according to the invention is capable of correcting zero points of the measuring means, while the product to be measured is accommodated in the measuring hoppers and is able to adjust a span which is a ratio of weight to output count of the measuring means in good timing in connection with the hopper selecting operation.

21 Claims, 22 Drawing Figures

MEASURING APPARATUS

BACKGROUND OF THE INVENTION

1. Field of the Invention

This invention relates to a measuring apparatus for measuring various kinds of products irregular in weight such as vegetables and fruits, confectionery, secondary processed goods, perishable foods and the like with constant qualities, and more particularly to an improvement of a measuring apparatus comprising distributing plates for transferring and distributing the product to be measured, a plurality of measuring hoppers arranged about a circumference of the distributing plates for receiving therein the product on the plates at a proper time, measuring means for measuring the transferred product in the hoppers, and computer means for selecting a plurality of measuring hoppers whose weight of product accommodated therein is equal or near to a set weight so as to exhaust the measured product from the hoppers, and more particularly an improvement of a span adjusting mechanism provided at each of the plurality of the measuring hoppers, a span adjusting method and a zero point correcting method of the measuring means.

2. Description of the Prior Art

One example of such a measuring apparatus will be explained with reference to FIGS. 1-3 illustrating the measuring apparatus disclosed in an application Ser. No. 518,632 previously filed by the applicant of this application.

The apparatus shown in the drawings comprises a distributing table 100, carrying-in troughs $b_1-b_{10}$ arranged on both sides of the distributing table 100, pool hoppers $c_1-c_{10}$, measuring hoppers $d_1-d_{10}$ and collecting hoppers 101, whereby product to be measured is transferred on the distributing table 100 in directions shown by arrows and then carried through the carrying-in troughs $b_1-b_{10}$ into the pool hoppers $c_1-c_{10}$ whose bottom plates are opened to transfer the product therein into the measuring hoppers $d_1-d_{10}$. Each of the measuring hoppers $d_1-d_{10}$ is engaged with one end of each measuring means (load cell in this case) which measures a weight of the product in the measuring hopper $d_1-d_{10}$ individually. An output of the measured value from the measuring means is input through an amplifier circuit 102 and an A/D converter 103 into a central processing unit (CPU) which selects a combination of the measuring hoppers whose weight of product is equal or near to a set weight. The product of the selected measured value is transferred into the collecting hopper 101 by opening the bottom plates of the measuring hoppers.

Each of the measuring means $e_1-e_{10}$ is provided with a saucer 104, above which is arranged a reference weight 106 on one end of a rockable rod 105 pivoted at its center to a fixed point. The rockable rod 105 is further provided at the other end with a solenoid 107. When the solenoid is actuated, the reference weight 106 is lowered onto the saucer 104, so that the measuring means $e_1-e_{10}$ is subjected to a load of the reference weight 106 to effect span adjusting. In this manner, a span adjusting mechanism is constructed in the measuring apparatus.

The term "span" used herein is intended to designate a ratio of a weight of product to be measured to an output of the measuring means. If the span is out of a suitable range, precise measurement cannot be effected.

It is therefore required to adjust the span for the measuring apparatus of this kind.

In the above measuring apparatus, span adjusting mechanisms are provided for every measuring means $e_1-e_{10}$, which make components of the apparatus complicated and require the same number of solenoids as that of the measuring means to make the apparatus expensive.

Moreover, it is required for the above amplifier circuit 102 to provide a zero point adjusting volume 108 and a span adjusting volume 109.

The above central processing unit (CPU) stores previously memorized output data from the measuring means $e_1-e_{10}$ under no-load condition (initial load) and subtracts the output data under no-load condition from output data under loaded condition when the product to be measured has been transferred in the measuring hoppers to calculate the weight of the product. Accordingly, the output data under no-load condition is required to be exact. If a zero point of the measuring means is changed due to creep of components in such means, change in temperature or the like it is necessary to correct the zero point. It is often required to correct the zero point during operation of the apparatus.

In general, it is required to remove the product from the measuring hoppers to bring the measuring means into a no-load condition. However, such a removal of the product every time of zero point correction is troublesome. In the above measuring apparatus having a number of measuring means whose measured values are to be selected, particularly, the removal of the product every time of zero point correction is not only troublesome but also lowers the operating efficiency for selecting and combining the measured values. Moreover, the one or more measuring hoppers whose measuring means are subjected to the zero point correction cannot take part in the combination of the selected measured values, thereby reducing the total number of the combination so as to lower the accuracy of the combination.

With the above measuring apparatus, moreover, the span adjusting has been effected in the following manner.

(1) The bottom plates of the measuring hoppers $d_1-d_{10}$ associated with the measuring means $e_1-e_{10}$ whose spans are to be adjusted are opened to evacuate the relevant measuring hoppers.

(2) The zero point adjusting volume 108 is operated to adjust the zero point of each circuit of the measuring means.

(3) The solenoid 107 for each of the measuring means to be adjusted is switched on to load or put the reference weight 106 onto the saucer 104.

(4) The span adjusting volume circuit 109 is operated to adjust the span of each of the measuring means.

(5) The solenoid 107 is turned off to remove the reference weight 106 from each saucer 104.

In the adjusting method, however, the volumes are manually adjusted so that the adjusting operation is inconvenient and requires much time which lowers the rate of operation of the measuring apparatus. Furthermore, it is objectionably necessary to return onto the distributing table the product exhausted when the bottom plates of the measuring hoppers were opened.

SUMMARY OF THE INVENTION

It is a first object of the invention to provide a span adjusting mecahnism for a measuring apparatus, which has fewer component parts and is inexpensive and simple in construction.

In order to achieve this object, a span adjusting mechanism according to the invention comprises a reference weight arranged in the proximity of each of the measuring means and a member engaging with all the reference weights so as to put or remove the weights in unison onto or from the measuring means.

It is a second object of the invention to provide a zero point correcting method, which is capable of correcting zero points under the condition of the measuring hoppers being filled with product to be measured to improve the workability of the measuring apparatus and accuracy of the combination of the hoppers.

In order to accomplish the aforementioned objects a zero point correcting method according to the invention comprises the steps of measuring a weight of a measuring hopper including the product to be measured by means of measuring means, memorizing output data from an A/D converter receiving the measured value from the measuring means, again measuring the weight of the measuring hopper including the product under the same condition as in the first measuring step after a lapse of a predetermined time, subtracting the output data and output data of the second measuring so as to find the difference between both output data to detect any change in zero point, and when a change is detected, adding or subtracting the difference to or from the zero point in a zero point register to correct it.

It is a third object of the invention to provide a span adjusting method for measuring means which can be carried out automatically without requiring any manual operation and which shortens the time required for the span adjusting to improve the rate of operation of a measuring apparatus and which is carried out at the time when a measuring hopper is empty in an operating condition of the measuring apparatus to eliminate any returning operation of the product to be measured.

In order to achieve this object, a span adjusting method according to the invention comprises automatically adjusting a measuring span in suitable time after product has been exhausted from a measuring hopper by opening its bottom plate.

It is a fourth object of the invention to further improve the above span adjusting method, which is capable of adjusting the span of measuring means, while a relevant measuring hopper includes product to be measured in a different manner from the above method requiring the measuring hopper to be empty, thereby further improving the rate of operation of a measuring apparatus and accuracy in combination of the measured values.

In order to achieve the above object, a span adjusting method according to the invention comprises automatically adjusting in a suitable time, a span of measuring means which are not selected for a combination of measured values.

The above two span adjusting methods may be effected individually or in combination with each other.

In the above span adjusting methods which use mechanisms for lowering and raising (putting or removing) reference weights onto or from measuring means, it is selectively possible to use the mechanism of the invention for lifting all the reference weights in unison, or the prior art mechanism for separately lifting reference weights for measuring means.

DESCRIPTION OF THE PREFERRED EMBODIMENT

Figure 1:
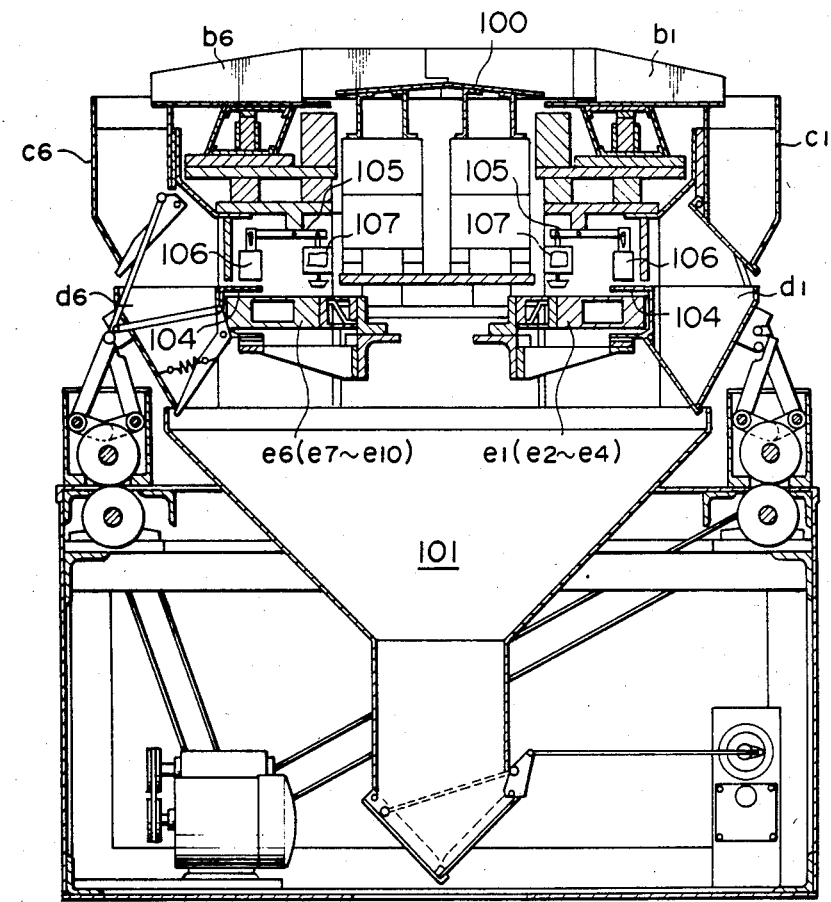
FIG. 1 is a sectional front view of one example of a measuring apparatus including a span adjusting mechanism of the prior art.
Figure 2:
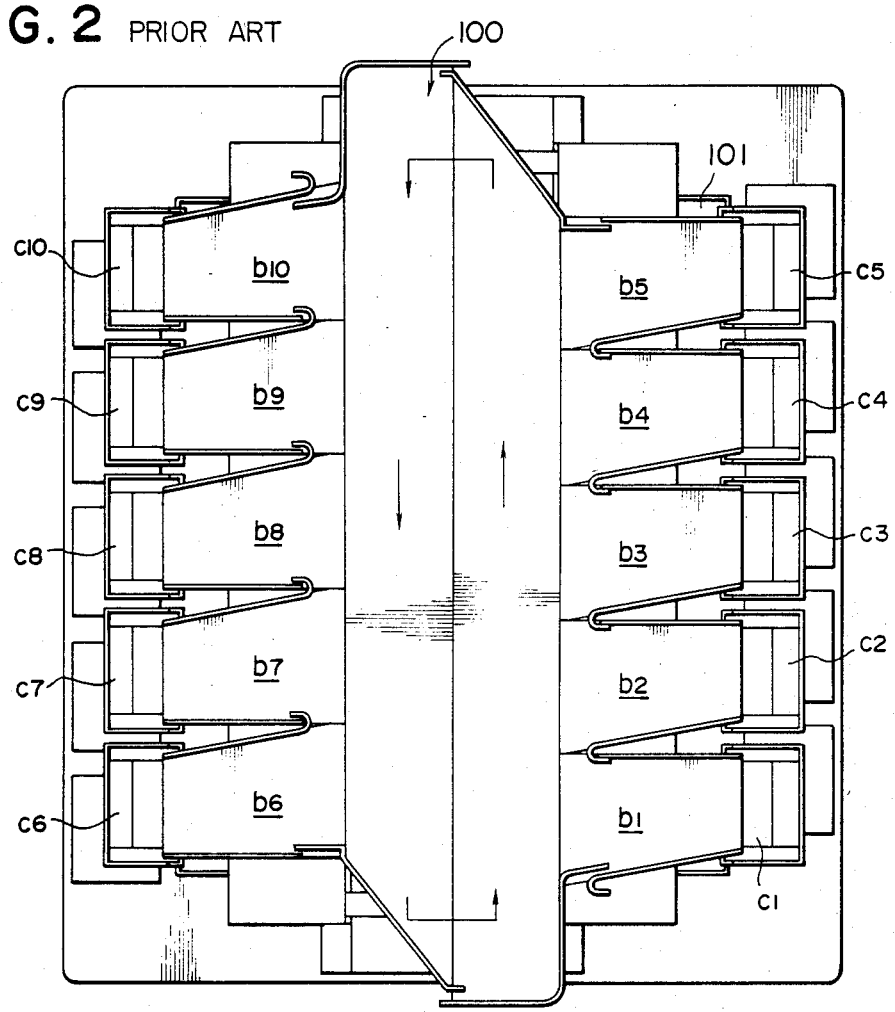
FIG. 2 is a plan view of the measuring apparatus shown in FIG. 1.
Figure 4:
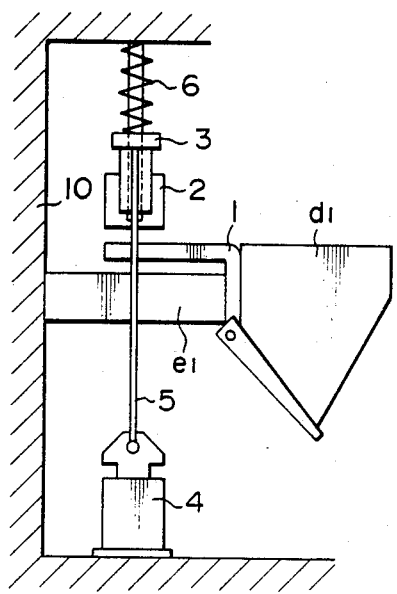
FIG. 4 is a front elevation of a span adjusting mechanism according to the invention.
Figure 5:
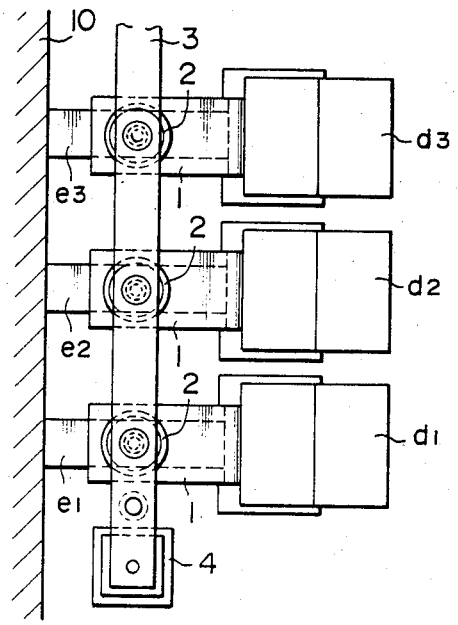
FIG. 5 is a plan view of the mechanism shown in FIG. 4.
Figure 6:
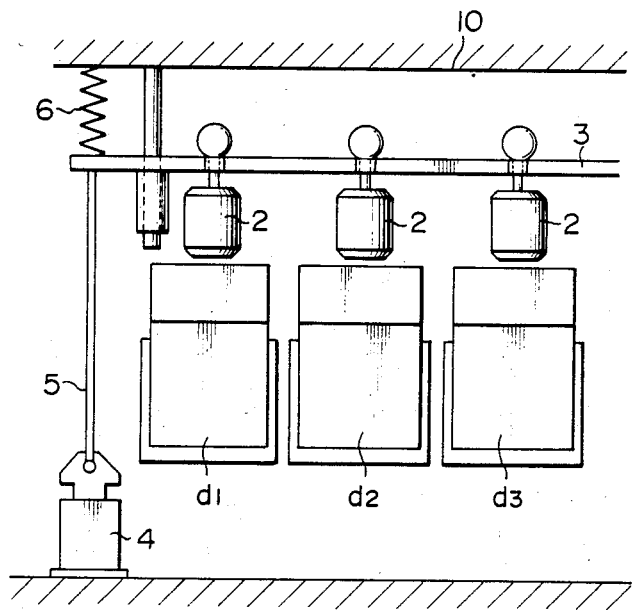
FIG. 6 is a side view of the mechanism shown in FIG. 5.

FIGS. 4-8 illustrate an improvement of the span adjusting mechanism in the measuring apparatus shown in FIGS. 1 and 2. Referring to FIGS. 4-6 illustrating one embodiment of the invention, the frame 10 is provided with a plurality of measuring means $e_1-e_{10}$ shown as load cells arranged side by side spaced with an interval ($e_4-e_{10}$ are not shown for the sake of clarity). Each load cell $e_1-e_{10}$ is provided at its end with a saucer 1 and a measuring hopper $d_1-d_{10}$ ($d_4-d_{10}$ are not shown for the sake of clarity).

A reference weight 2 is arranged above each saucer 1 by engaging a knob of the weight 2 with a lifting plate 3.

The lifting plate 3 is provided at its each end on an upper side with a spring 6 pulling it upward and on a lower side with a connecting rod 5 operatively connected to a solenoid 4 (FIG. 4), so that when the solenoids are actuated, the lifting plate 3 is lowered to load the reference weights 2 onto the respective saucers 1.

It is understood that there are sufficient clearances between the knobs of the reference weights 2 and apertures of the lifting plate 3 for the knobs, so that the saucers 1 are not subjected to the weight of the lifting plate 3 when the reference weights 2 are settled on the sources 1.

The span adjusting mechanism is able to load or unload all the reference weights 2 simultaneously onto or from the saucers by switching on or off the solenoid 4.

Figure 7:
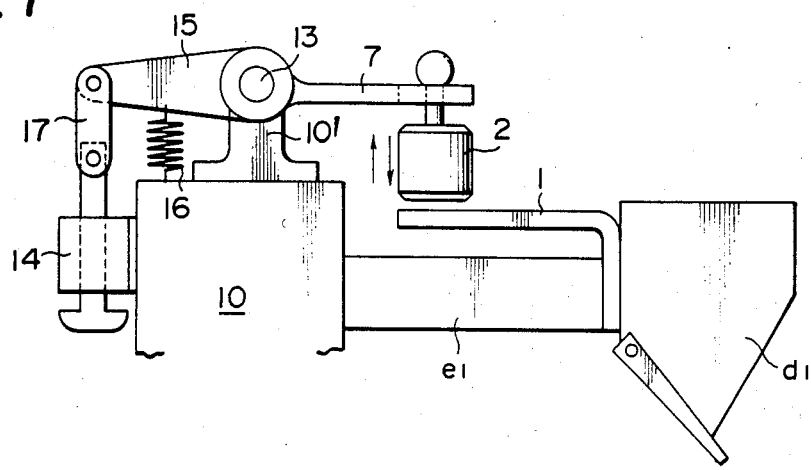
FIG. 7 is a front elevation of a modification of the span adjusting mechanism.
Figure 8:
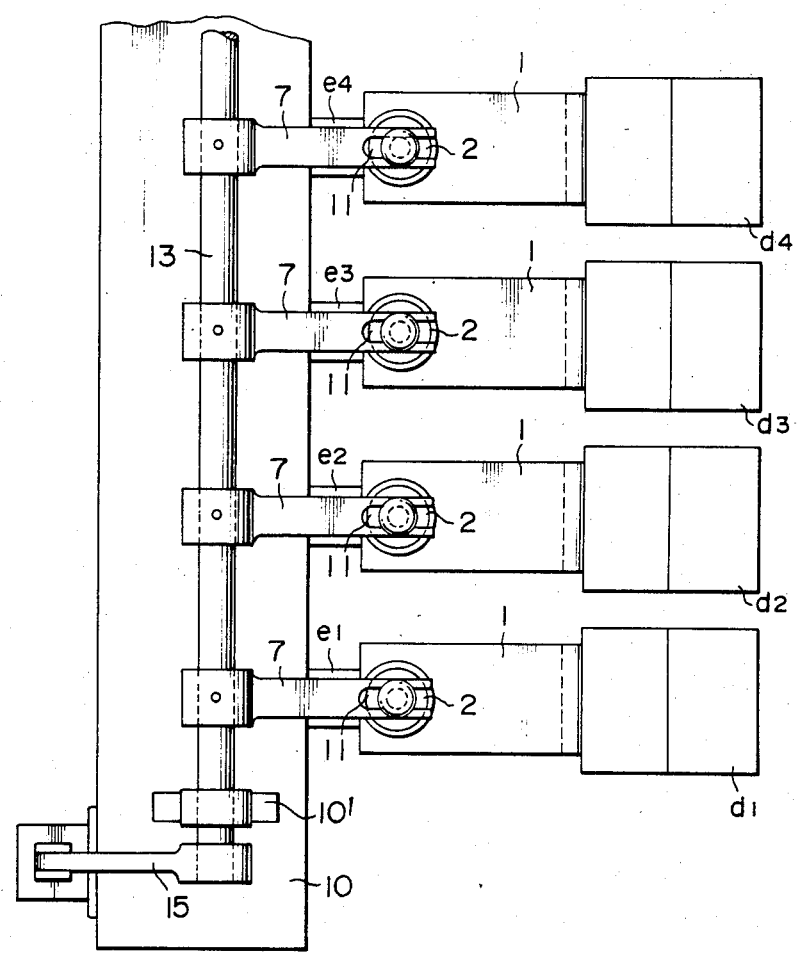
FIG. 8 is a plan view of the mechanism shown in FIG. 7.
Figure 9:
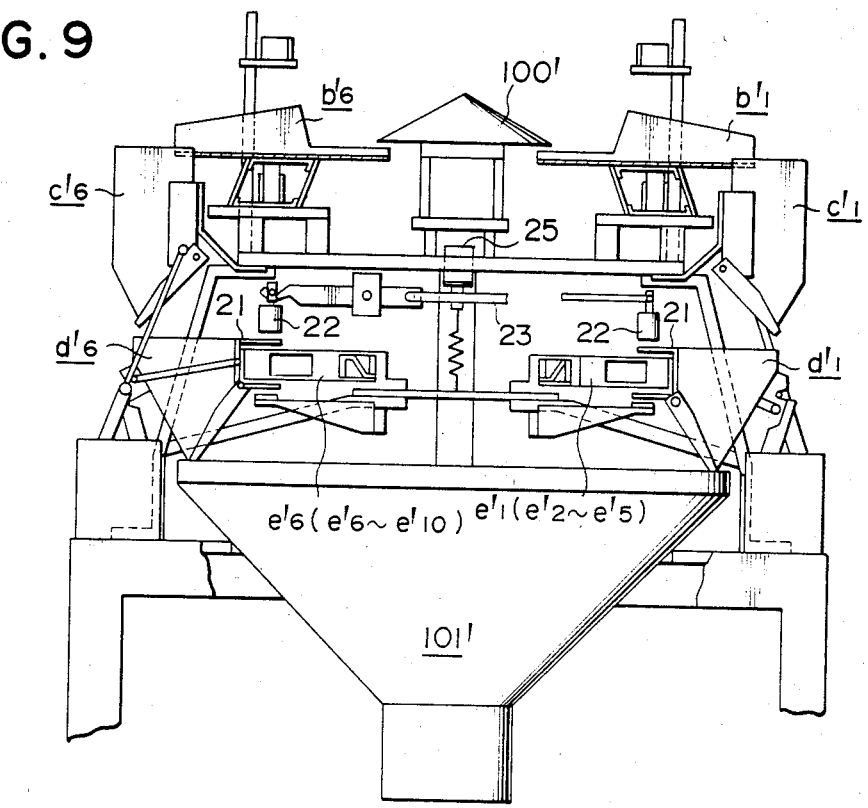
FIG. 9 is a front elevation of another measuring apparatus with the span adjusting mechanism according to the invention.
Figure 10:
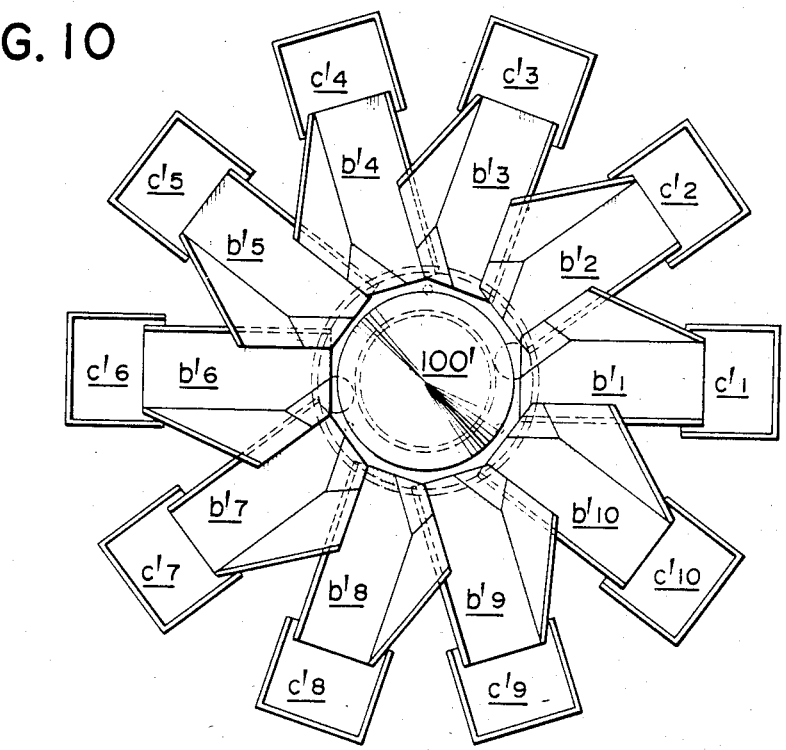
FIG. 10 is a plan view of the measuring apparatus shown in FIG. 9.
Figure 11:
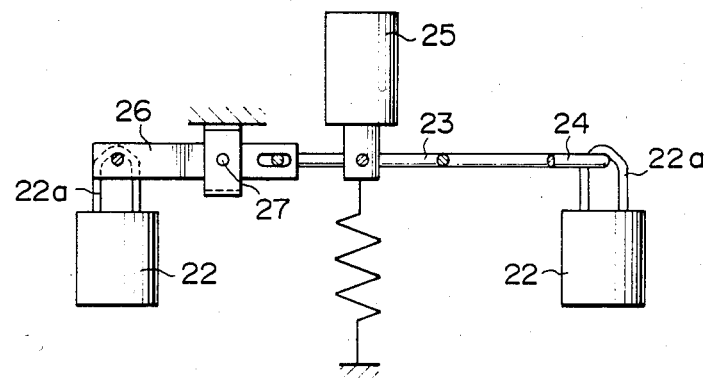
FIG. 11 is a front elevation of an important portion of the mechanism shown in FIG. 9.
Figure 12:
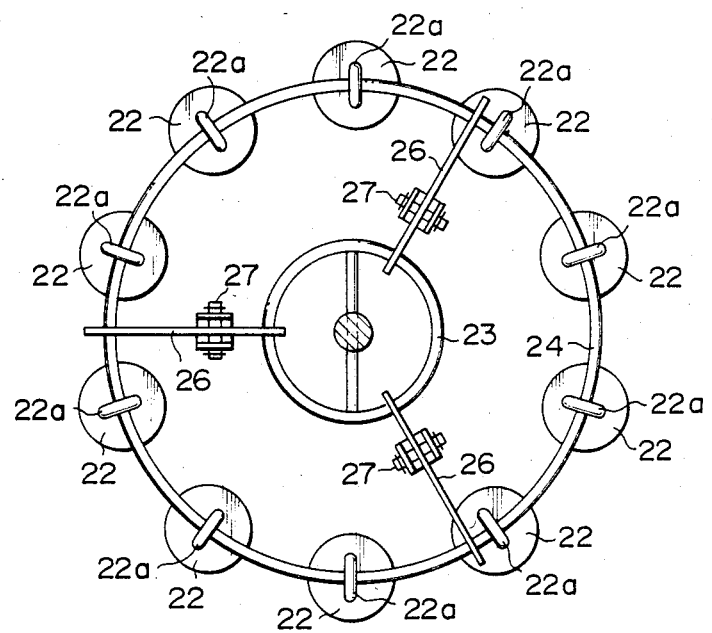
FIG. 12 is a plan view of the portion shown in FIG. 11.

FIGS. 7 and 8 illustrate a modification of the embodiment previously explained, wherein like components have been designated by the same reference numerals. This mechanism includes ten measuring hoppers $d_1$-$d_{10}$ and ten measuring means $e_1$-$e_{10}$, but only four hoppers $d_1$-$d_4$ and four measuring means $e_1$-$e_4$ are shown in the drawings for the sake of clarity.

Referring to FIGS. 7 and 8, a frame 10 is provided near its ends with bearings 10' for rotatably journaling a shaft 13 on which are fitted members 7 of the same number as that of reference weights 2 and fixed thereat by pins. Each member 7 is formed at its end with an elongated slot 11 for receiving a knob of each reference weight 2.

To one end of the shaft 13 is fixed a driving rod 15 provided with a spring 16 which pulls it so as to keep reference weight 2 suspended. A free end of the driving rod 15 is connected to one end of a connecting rod 17 operatively connected to a solenoid 14. When the solenoid 14 is actuated, the end of the driving rod 15 is raised to load or put the reference weights 2 onto the saucers 1. This span adjusting mechanism is also able to load or unload all the reference weights 2 simultaneously onto or from the saucers 1 by switching on or off the solenoid 14.

FIGS. 9-14 illustrate one embodiment of the span adjusting mechanism according to the invention applied to another measuring apparatus, more particularly including a conical distributing plate.

In the drawings, the conical distributing plate 100' is spirally reciprocated in vertical directions to distribute products thereon toward its circumference. Carrying in troughs $b_1'$-$b_{10}'$ are arranged radially outward of the distributing plate 100', and pool hoppers $c_1'$-$c_{10}'$ and measuring hoppers $d_1'$-$d_{10}'$ are arranged below the outward ends of the carrying-in troughs $b_1'$-$b_{10}'$. This apparatus further includes measuring means $e_1'$-$e_{10}'$ exemplarily showing load cells and collecting hoppers 101'. In the embodiment shown in FIGS. 9-12, each of the measuring means $e_1'$-$e_{10}'$ is provided with a weight saucer 21 above which a reference weight 22 is arranged.

Each reference weight 22 is integrally formed on its upper surface with a hanging eye 22a extending therefrom. An annular member 24 extends through all the hanging eyes 22a of the reference weights 22 for lifting them and is provided at a center of the annular member with a solenoid 25 having a ring member 23.

The ring member 23 is moved vertically by switching on or off the solenoid 25 and is connected to the annular member 24 by means of levers 26.

The levers 26 are pivotally movable respectively about pivots 27 provided on the frame of the combined balance and connect at their ends the annular member 24 to the ring member 23 so as to raise or lower all of the reference weights simultaneously by switching on or off the solenoid 25.

In this embodiment, the respective reference weights 22 hanging from the annular member 24 are simultaneously loaded or put onto the weight saucers 21 by actuating the solenoid 25.

Figure 13:
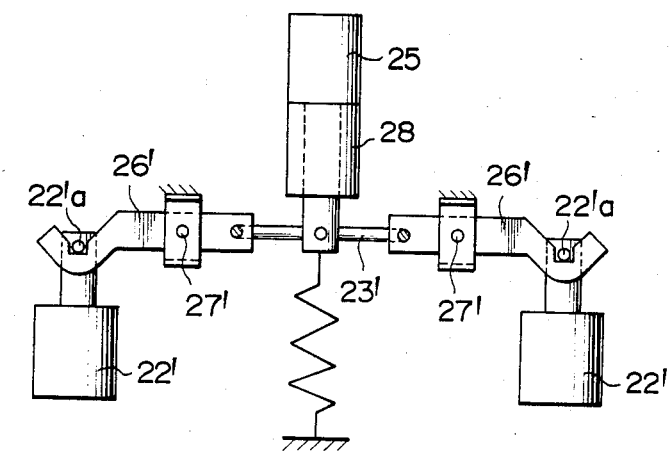
FIG. 13 is a front elevation of a modification of the important portion shown in FIG. 11.
Figure 14:
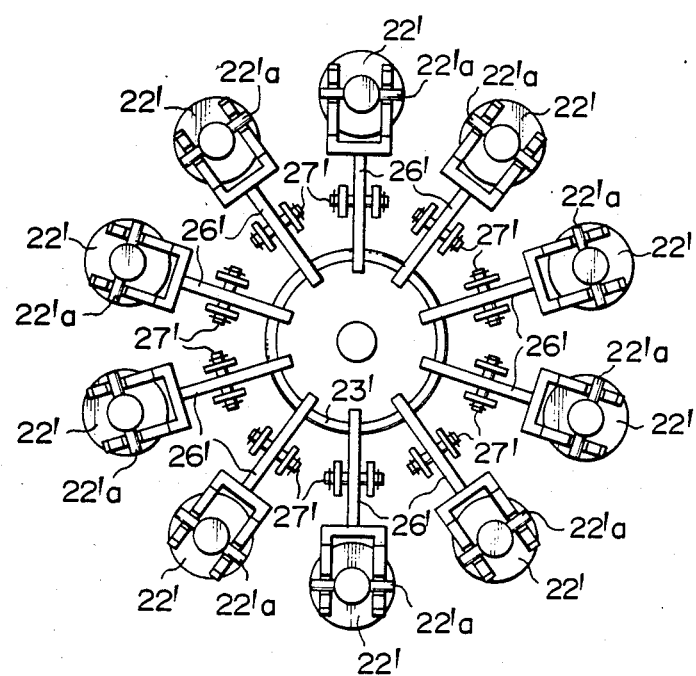
FIG. 14 is a plan view of the portion in FIG. 13.

Referring to FIGS. 13 and 14 illustrating a further modification of the embodiment shown in FIGS. 9-12, each reference weight 22' is integrally provided with a horizontally extending hanging pin 22a'.

A ring member 23' is arranged at the center of the reference weights 22' so as to be connected through levers 26' to the weights and is adapted to be vertically moved by switching on and off a solenoid 25.

The levers 26' are pivotally movable about pivots 27' provided on a frame of the combined balance, so that the reference weights are vertically moved in response to the vertical movement of the ring member 23'. The solenoid 25 is guided in its vertical movement by a guide member 28.

All the reference weights 22' hung by the levers 26' are loaded or put onto weight saucers 21 simultaneously.

In the embodiments of the span adjusting mechanism explained and illustrated in FIGS. 4-14, the reference weights 2, 22 or 22' are lowered onto the plurality of measuring means $e_1$-$e_{10}$ or $e_1'$-$e_{10}'$, thereby simultaneously loading or putting all the weights onto the measuring means, and then removed away from the measuring means at one time. Therefore, the apparatus according to the invention uses a less number of solenoids in comparison with the prior art mechanisms whose solenoids are provided for every measuring means, thereby minimizing the number of solenoids to reduce the parts of the apparatus and making it simple in construction and inexpensive to manufacture. In the above span adjusting the mechanism, the span adjusting of measuring means is effected, while the reference weights $e_1$-$e_{10}$ or $e_1'$-$e_{10}'$ are on the measuring means. It may be carried out by manually rotating a span adjusting volume as in the prior art, or with the aid of an automatic span adjustment later described.

Figure 16:
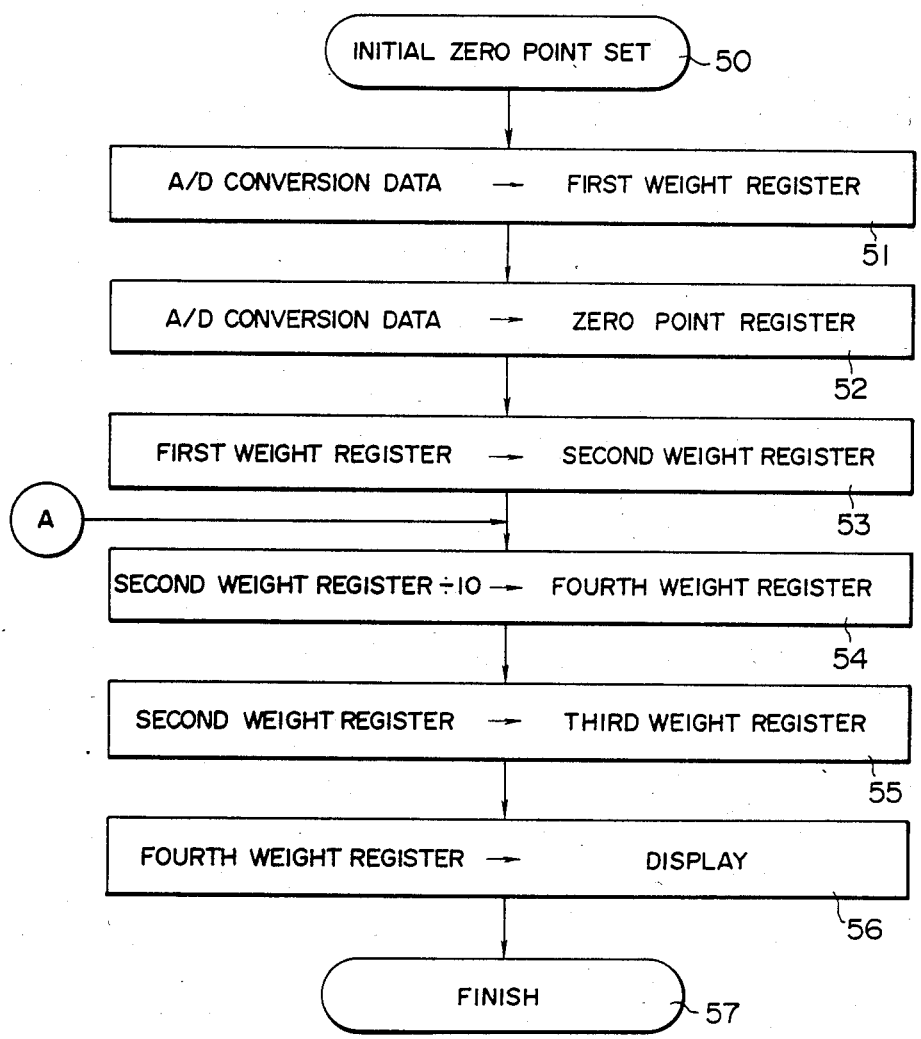
FIG. 16 is a flow chart of the block diagram shown in FIG. 15.
Figure 17:
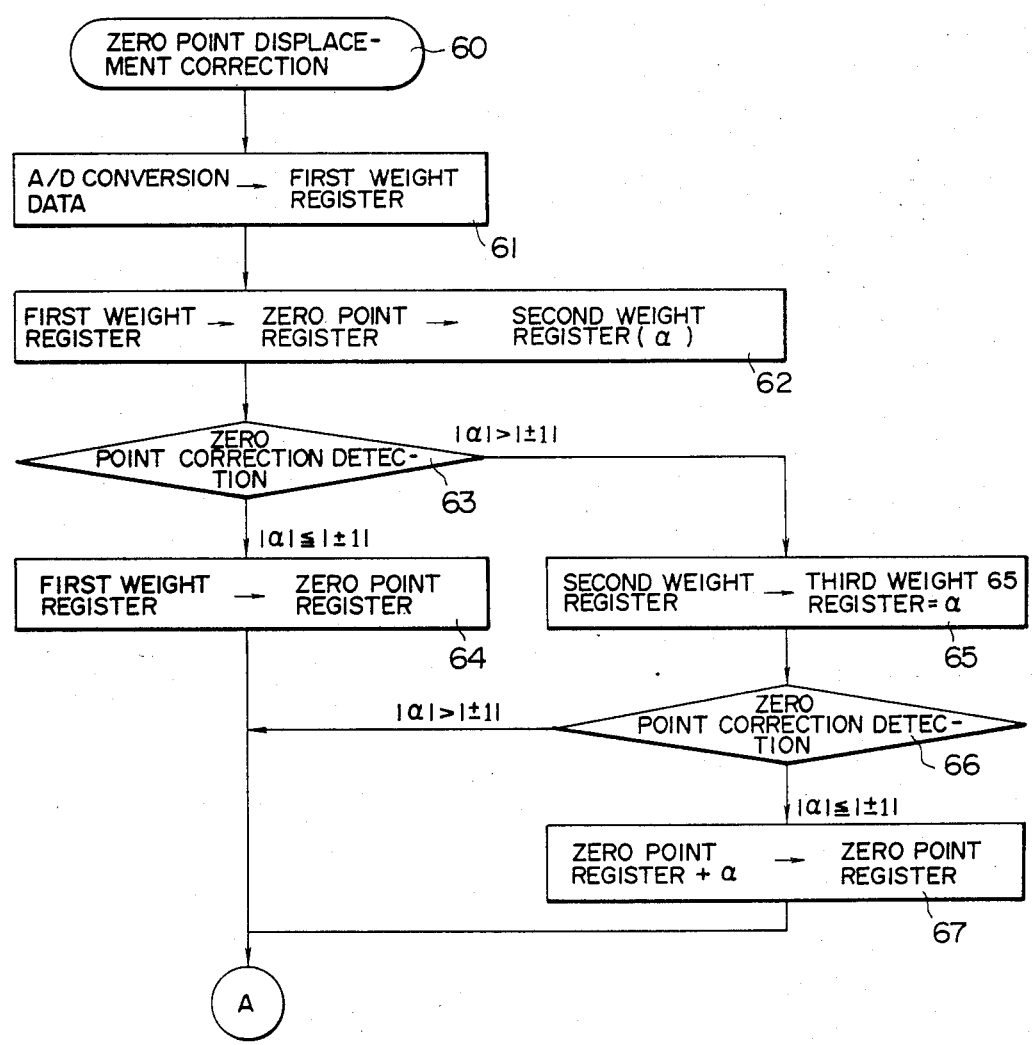
FIG. 17 is a flow chart for explaining zero point adjusting according to the invention.

A zero point adjusting method according to the invention will be explained with reference to FIGS. 15-17. A basic principle of the zero point corrections is as follows.

$$ACR = ADR - AZR,$$

where
AZR ... output count when the product to be measured is not loaded,
ADR ... output count when product to be measured is loaded, and
ACR ... output indicating measured value.

The product weight is obtained by converting the ACR. The output count is output data in this invention.

If AZR increases or decreases to $AZR'$ ($=AZR+\alpha$) by a count number $\alpha$ due to temperature change or the like, ADR also changes to $ADR'$ ($=ADR+\alpha$) by the count number $\alpha$. Without zero point correction, a false indication of ACR is caused. In other words, $$ACR \neq ADR' - AZR \qquad (1)$$
$$\neq ADR - AZR + \underline{\alpha}$$

The count number $\alpha$ is an error.

From the equation (1), $ADR' - ADR = \alpha$ is obtained. If the AZR is corrected with count number $\alpha$, $AZR'$ can be obtained. In this case, it is not required to unload or remove the product to be measured from the measuring means to bring it into a no-load condition:

$$AZR' = AZR + \alpha$$

Accordingly, $$\begin{aligned} ACR &= ADR' - AZR' \\ &= (ADR + \alpha) - (AZR + \alpha) \\ &= ADR - AZR \end{aligned}$$

Complete correction is obtained.

In the above explanation, the correction value $\alpha$ is obtained from $ADR'$ and $ADR$. However, the correction value $\alpha$ may be calculated from $ACR' - ACR = \alpha$, in consideration of $ACR'$ concerning the error $\alpha$ in the equation (1).

Figure 15:
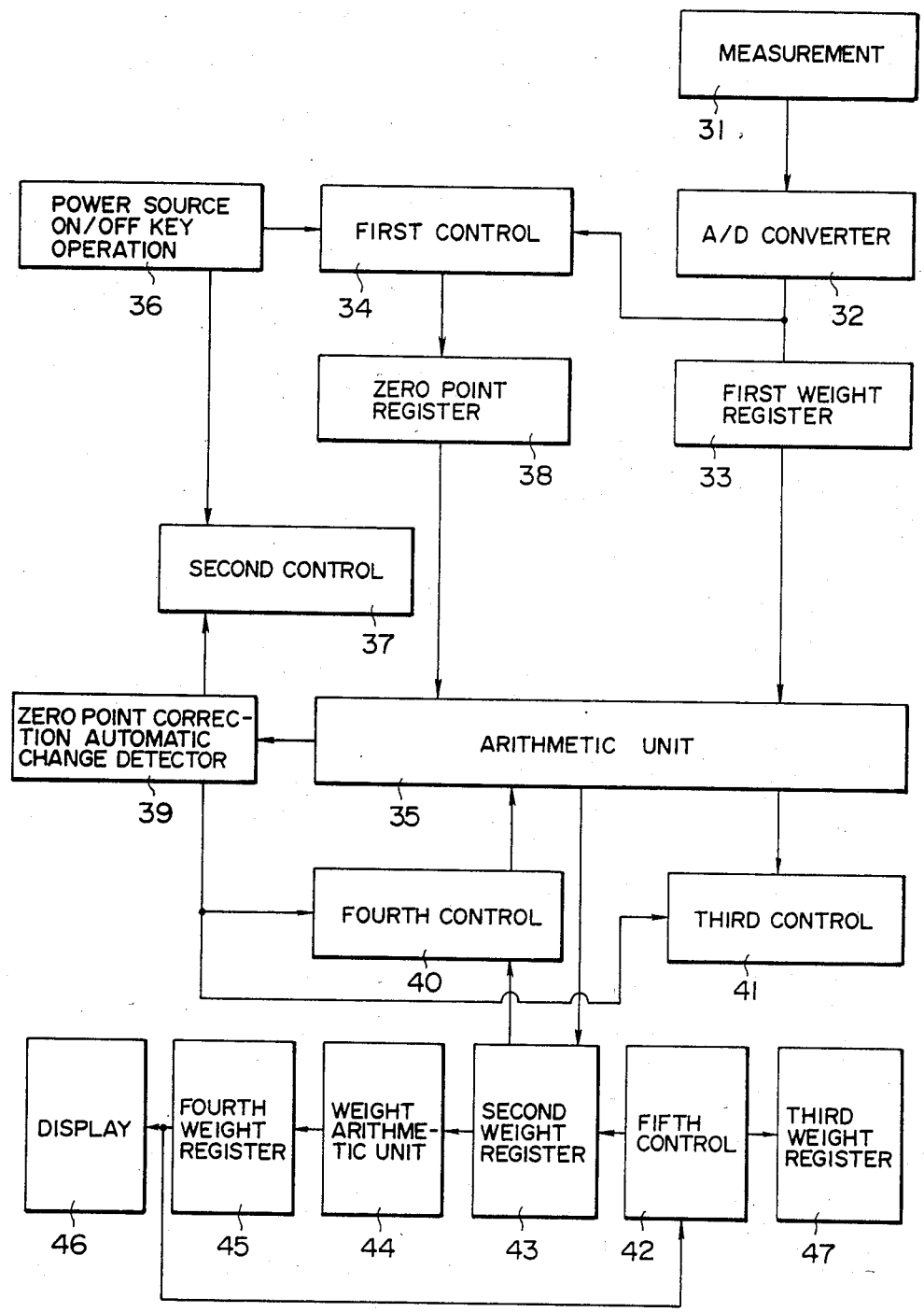
FIG. 15 is a block diagram of the measuring apparatus according to the invention.

Referring to FIG. 15 illustrating a measuring apparatus capable of effecting a zero point correction based on the above principle, measurement apparatus 31 in the drawing includes the above measuring hoppers $d_1$-$d_{10}$ and measuring means $e_1$-$e_{10}$, whose output is input into an A/D converter 32. The A/D converter 32 converts analog outputs from the measurement apparatus 31 into digital signals which are input into a first weight register 33 and a first control circuit 34, respectively.

The first weight register 33 memorizes the output count from the measurement apparatus 31 and inputs the output count into an arithmetic unit 35.

The first control circuit 34 is actuated by switching on a power source or key 36 to input the output count from the measurement apparatus 31 under a no-load condition into a zero point register 38 which memorizes the output count under a no-load condition and inputs it into the arithmetic unit 35.

The arithmetic unit 35 subtracts the output count memorized in the zero point register 38 from the output count under a loaded condition from the first weight register 33 to obtain measured output count which is input into a second weight register 43.

The second weight register 43 memorizes the measured output count and is connected to a fourth control circuit 40 and a weight arithmetic unit 44.

The weight arithmetic unit 44 performs an arithmetic operation of the measured output count from the second weight register 43 to indicate it as a weight signal at a display 46.

At the same time when the display 46 indiates the weight signal, a fifth control 42 makes a third weight register 47 memorize the measured output count from the second weight register 43.

The measured output count from the second weight register 43 is input through a fourth control circuit 40 into the arithmetic unit 35. On the other hand, the measured output count from the third weight register 47 is input through a third control 41 into the arithmetic unit 35.

A zero point correction automatic change detector 39 (referred to as "detector" hereinafter) gives instructions to second, third and fourth control circuit 37, 41 and 40. When the next measured output count has been input into the second weight register 47 at which moment the third weight register 47 has already memorized the preceding measured output count, the detector 39 gives instructions to the third and fourth control circuits 41 and 40 to input the measured output counts from the second and third weight registers 43 and 47 into the arithmetic unit 35.

The arithmetic unit 35 calculates the difference between the measured output counts from the second and third weight registers 43 and 47 to obtain a correction value and inputs the correction value into the detector 39 which corrects the measured output count with the correction value and inputs the corrected output count into the second control 37.

The detector 39 inspects the correction value to judge whether a correction is required or not. When the correction is required, the detector 39 gives an instruction to the second control 37 to correct the measured output count. The corrected measured output under a no-load condition is memorized in the zero point register 38.

The setting of initial zero point will be explained referring to a flow chart in FIG. 16. First, when the product to be measured is not loaded onto the measuring apparatus, by switching on the power source or key operation at 50 the output count from the measurement apparatus 31 is input through the A/C converter 32 into the first weight register 33 and the zero point register 34 at 51 and 52.

As the output count (internal count) to the second weight register 43 is generally increased by one figure in consideration of measuring accuracy, the output count is divided by ten (10) to input the divided counts into the fourth weight register 45. The output count may be divided by a number from five to one hundred instead of ten according to the desired measuring accuracy.

The measuring output count from the second weight register 43 is then input into the third weight register 47, while the weight in the fourth weight register 45 is input into the display 46 at 56 to indicate "zero" before measuring.

When it is judged that the change in output count is not due to change in zero point caused by the zero point correction in FIG. 17 as explained hereinafter, the product to be measured is loaded onto the measuring apparatus. The process 54 and the following processes are repeated to indicate the weight.

The zero point correction of the above measuring apparatus will be explained by referring to FIG. 17. The zero point correction is started by key operation or the like at 60 to input the next output count into the first weight register 33 at 61.

Then the content of zero point register 38 is subtracted from the first weight register 33 to obtain a correction value $\alpha'$ at 62.

Whether the correction value $\alpha'$ is less or more than a set value or one count, that is ($|\alpha'| < |\pm 1|$) or ($|\alpha'| > |\pm 1|$) is detected at 63. If the correction value $\alpha'$ is less than one count, the data from the first weight register 33 should not be input into the zero point register 38 at 64.

If the correction value $\alpha'$ is more than one count, the measured output counts of the second and third weight registers 43 and 47 should be subtracted to output a count difference $\alpha$ as a correction value at 65.

If the correction value $\alpha$ is less than a set value according to the accuracy of the measuring means, for example, one count, that is, ($|\alpha| < |\pm 1|$), the same product on the measurement apparatus 31 at 66 to correct the zero point register 38 by the correction value $\alpha$. On the other hand, if the correction value $\alpha$ is more than one count, that is, ($|\alpha| > |\pm 1|$), a determination is made at 67 that the load has changed to another load and to repeat the process 64 and the following measuring processes.

The zero point corrections of the measuring means $e_1-e_{10}$ or $e'_1-e'_{10}$ for the relevant measuring hoppers $d_1-d_{10}$ can be effected while these hoppers are filled with the product to improve the security in measuring and at the same time to eliminate errors due to creep which is usually overlooked and results from an initial load such as the weight of the measuring hopper to which the measuring means is subjected.

FIGS. 18–22 are illustrations for explaining the span adjusting method of the measuring means according to the invention. A principle of the automatic span adjusting is as follows.

m: output under no-load (initial load) condition of measuring means $e_1-e_{10}$ or $e'_1-e'_{10}$ $X_o$: weight of reference weights 2 or 22 and 22'

$Y_o$: Output of the measuring means under $X_o$ loaded condition n: constant for span adjusting.

Among the above assumed values, the $X_o$ is a known value which has been input and stored in the central processing unit (CPU). The constant n is detected before the reference weight $X_o$ is loaded for span adjusting, and the $Y_o$ output is detected after the weight $X_o$ is loaded to input them into the CPU.

The CPU performs its arithmetic operation of $n = (Y_o - m/X_o)$ to calculate the constant n, and memorizes it to complete the span adjusting.

In other words, X is exactly calculated by an arithmetic operation of $X = (Y - m/n)$,
where X: weight of product to be measured Y: output of measuring means under X load.

Figure 3:
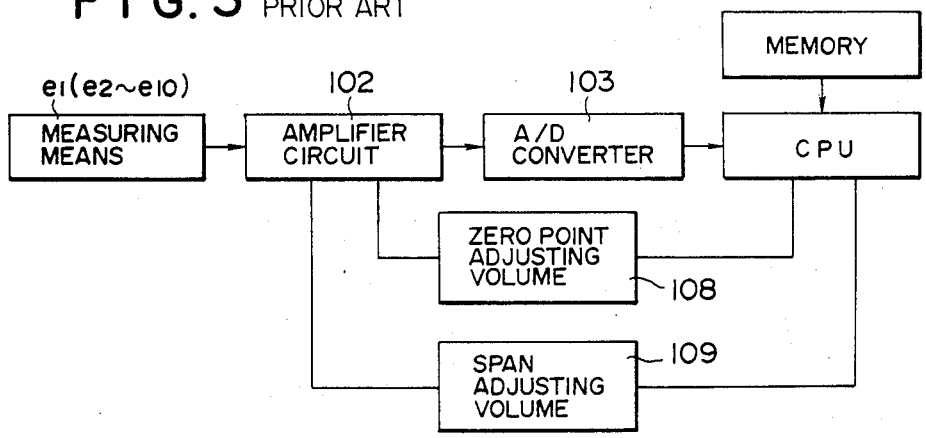
FIG. 3 is a block diagram of the measuring mechanism of the prior art.

The adjusting may be effected according to another principle. In this case, the zero point adjusting volume 108 and the span adjusting volume 109 of the prior art adjusting means as shown in FIG. 3 are provided with automatic adjusting members such as pulse motors or the like, respectively.

Figure 18:
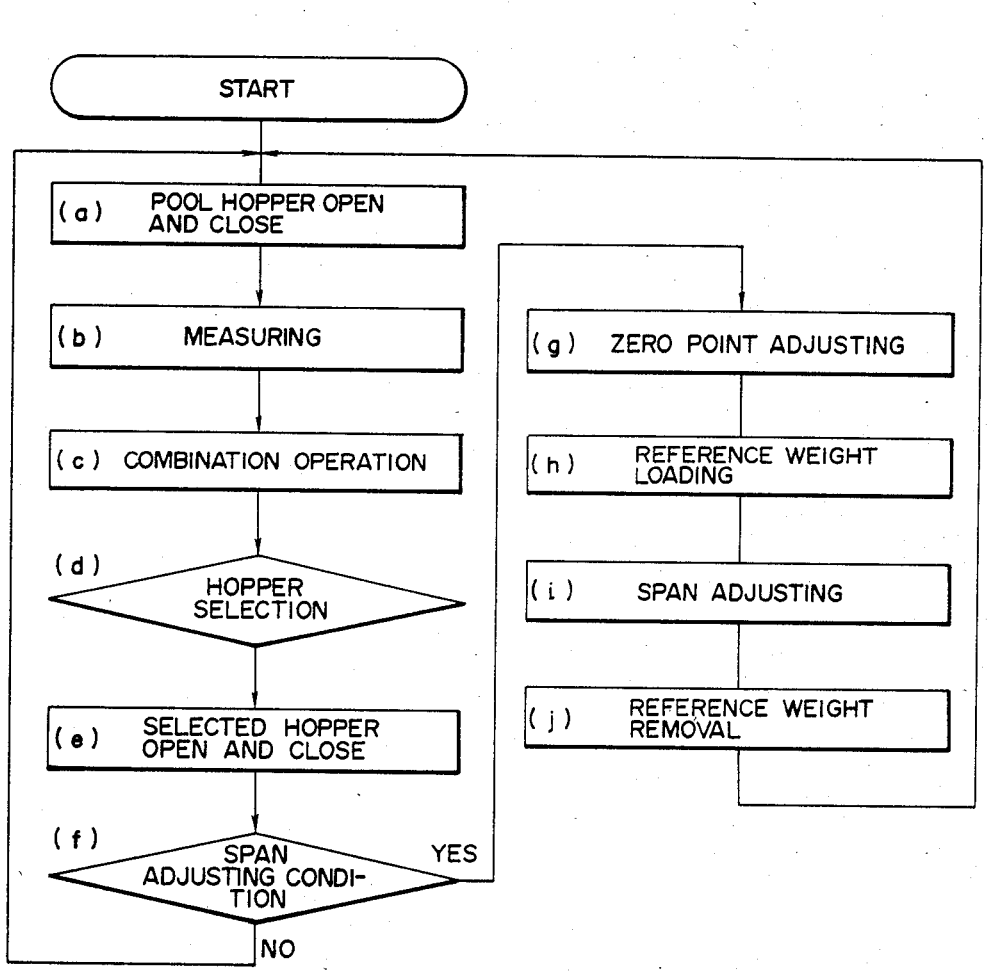
FIG. 18 is a process diagram of a span adjusting method according to the invention.
Figure 19:
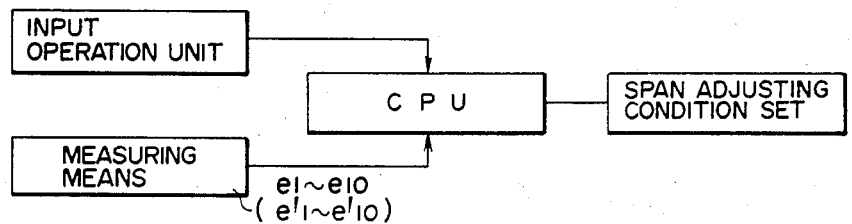
FIG. 19 is an explanatory diagram for explaining the process diagram shown in FIG. 18.
Figure 20:
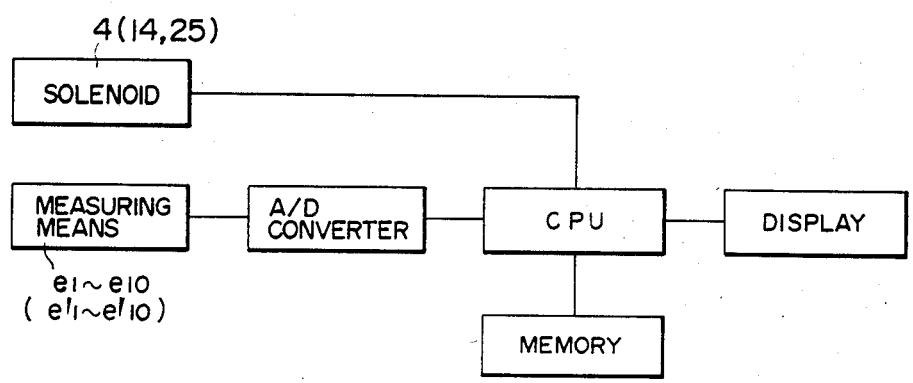
FIG. 20 is a block diagram for controlling the measuring apparatus according to the invention.

FIGS. 18–22 illustrate a span adjusting method with improved timing for a measuring apparatus including a plurality of measuring hoppers and measuring means. The method shown in FIGS. 18–20 is intended to carry out automatic span adjusting for measuring means (a plurality of $e_1-e_{10}$ or $e'_1-e'_{10}$) of measuring hoppers (a plurality of $d_1-d_{10}$ or $d'_1-d'_{10}$) selected for the combination of measured values when the bottom plates of the selected measuring hoppers are opened to exhaust the product to be measured in a measuring apparatus.

The operation of the measuring apparatus will be explained with reference to FIG. 18.

(a) The pool hoppers $c_1-c_{10}$ or $c'_1-c'_{10}$ are opened and closed to transfer the product into the measuring hoppers $d_1-d_{10}$ and $d'_1-d'_{10}$.

(b) The measuring means $e_1-e_{10}$ or $e'_1-e'_{10}$ measure the product to input the measured values into the central processing unit (CPU).

(c) The central processing unit performs the arithmetic operation for selecting a combination of measured values equal or near to a predetermined weight value.

(d) The measuring hoppers are selected according to the result of the arithmetic operation.

(e) The measuring hoppers of the selected measured values are opened and closed to transfer the product out of the hoppers to empty them.

(f) The span adjusting condition is evaluated to determine whether the above processes are to be repeated or span adjusting is to be effected. The above processes, are repeated from the process (a).

Various examples of span adjusting conditions for determining the timing of the above span adjusting are as follows.

(1) A key switch is provided for span adjusting. The key switch is turned on for example in the above processes (a)–(e), then the pool hoppers $C_1-C_{10}$ or $C'_1-C'_{10}$ are not opened or the product is not supplied into these pool hoppers after completion of the processes to perform the span adjusting.

(2) The central processing unit is provided with a timer connected thereto. The span adjusting is effected in the initial process (f) after the time set by the timer has lapsed.

(3) The measuring means, measuring hopper or the like is provided with a counter. The span adjusting is effected in the initial process (f) after a set number of measuring has been completed.

(4) A temperature sensor is provided in the proximity of the measuring apparatus. A room temperature which is at a predetermined temperature is detected, and span adjusting is effected in the initial process (f) thereafter.

In other words, the above described span adjusting condition is associated with the central processing unit (CPU) as shown in FIG. 19 to judge whether it does fulfil a predetermined condition.

If the judgement as to span adjusting in the process (f) is YES, the span adjusting is effected as follows.

(g) The zero points of the relevant measuring means (a plurality of $e_1-e_{10}$ or $e'_1-e'_{10}$) are automatically adjusted. For example, the zero point adjusting volume is driven by a pulse motor or the like to adjust the zero point in such a manner that the output from the A/D converter coincides with the zero point reference value memorized in a memory.

(h) After zero point adjusting, the solenoid 4, 14 or 25 is turned on to load or put the reference weights 2, 22 or 22' onto the saucers 1 or 21.

(i) The above described automatic span adjusting is effected.

(j) On completion of span adjusting, the solenoid 4, 14 or 25 is turned off to unload or remove the weights 2, 22 or 22' from the saucers 1 or 21.

Moreover, the numbers of the measuring means whose spans have been adjusted may be memorized and the spans of the measuring means which have not been adjusted may be preferentially adjusted when the measuring hoppers associated with the measuring means are empty.

Figure 21:
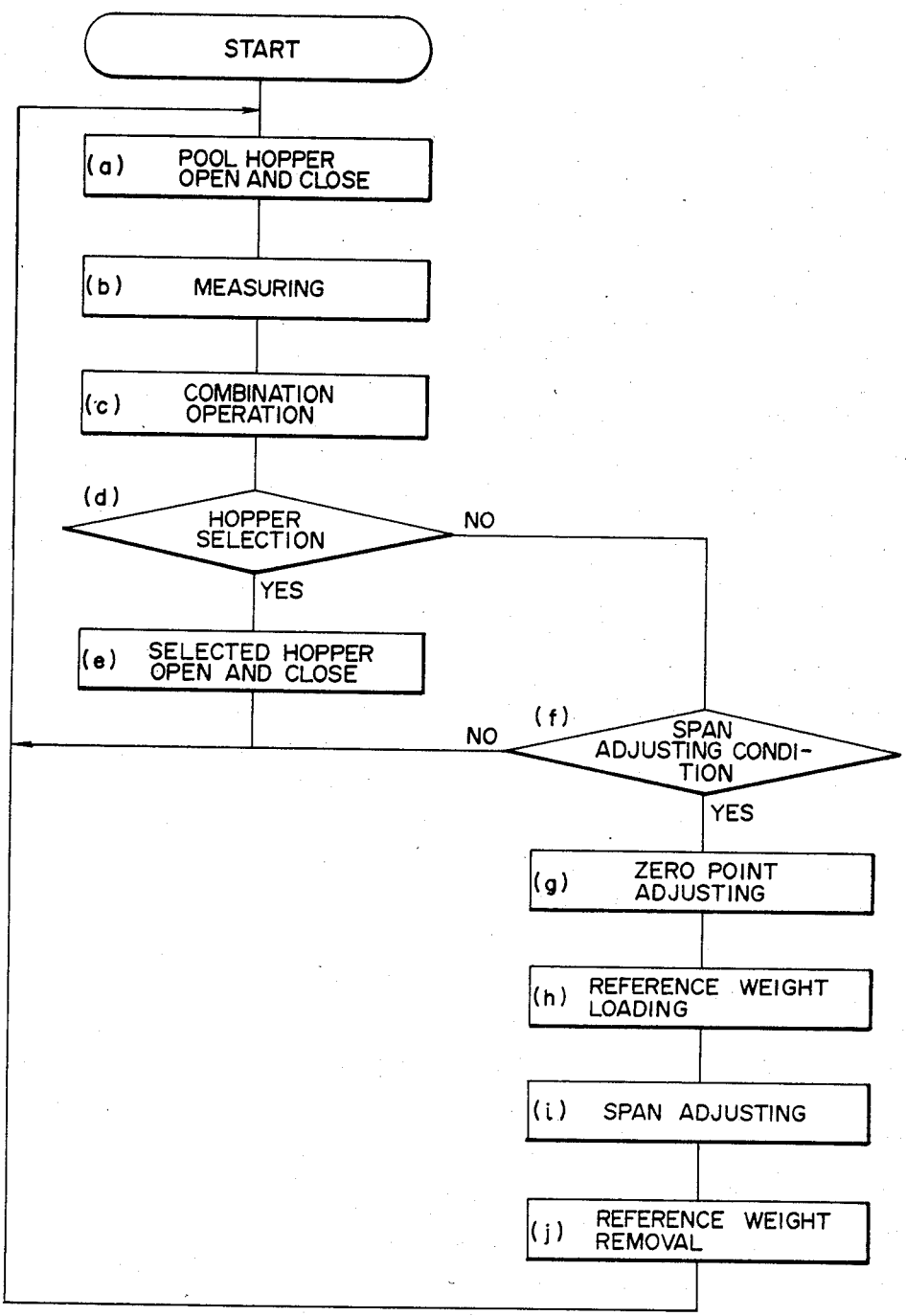
FIG. 21 is a flow chart for explaining a modification of the span adjusting method according to the invention.

FIG. 21 illustrates a modification of the span adjusting method wherein the span adjusting of measuring the means is carried out when the relevant measuring hoppers are filled with the product, which have not been selected for the combination of measured values for a measuring apparatus.

In this case, the operating processes of the measuring apparatus are substantially identical with those shown in FIG. 18 with the exception that the span adjusting condition determining process (f) is applied to the measuring hoppers which were not selected in the hopper selecting process (2). Accordingly, the operation and processes will not be described in further detail.

Figure 22:
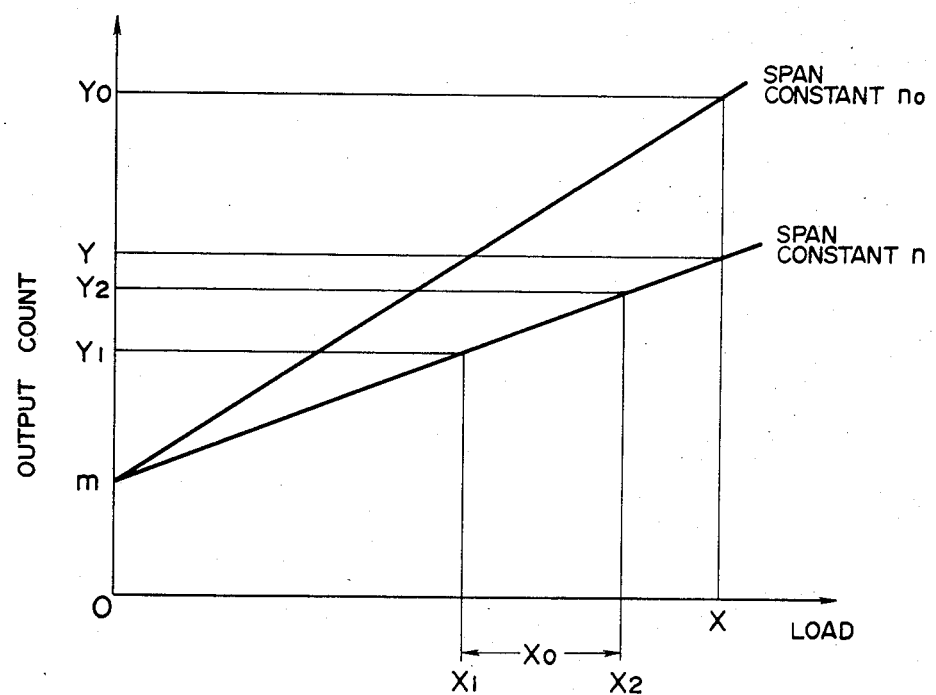
FIG. 22 is a graph illustrating the principle of the modification of the span adjusting method according to the invention.

The span adjusting process (i) as shown in FIG. 21 will be explained with reference to FIG. 22.

m: output under no-load (initial load) condition of measuring means $e_1-e_{10}$ or $e'_1-e'_{10}$ $n_o$: span constant before span adjusting X: weight of product to be measured accommodated in measuring means $d_1-d_{10}$ or $d'_1-d'_{10}$ $Y_o$*: output of measuring means under X-loaded condition with span constant number.

The central processing unit performs an arithmetic operation of $X=(Y_o-m/n_o)$ to obtain the weight X of the product.

However, when the span constant number changes to n, the output of the measuring means also changes to Y. The central processing unit performs the arithmetic operation of $X=(Y-m/n)$ ... (i) to obtain the weight X. Accordingly, it is required to know the span constant n.

$X_1$: weight of product to be measured accommodated in measuring means $X_o$: weight of reference weight 2 or 22, 22'

$X_2=X_1+X_o$ $Y_1$: output of measuring means under X-loaded $Y_2$: output of measuring means under $X_2$-loaded n: span constant after adjusting.

With the above assumptions, the values other than the span constant n are obtained by loading the reference weights 2 or 22, 22'. The span constant n is obtained by arithmetic operation of $n=(Y_2-Y_1/X_o)$, because the span constant is the inclination of a line of the graph in FIG. 22.

The obtained value of span constant n is substituted for the span constant n of the equation (i) and memorized in the central processing unit to complete the span adjusting.

According to the span adjusting method in FIG. 21, span adjusting of the measuring means can be carried out with the measuring hoppers filled with product without evacuating the hoppers. Particularly, by combining the zero point correcting process (g) preceding the span adjusting into the zero point correcting method shown in FIGS. 15-17 and the span adjusting method in FIG. 21, the zero point correcting and span adjusting of the measuring means can be continuously effected with the relevant measuring hopper filled with the product to be measured in the effective manner.

Moreover, according to the measuring methods shown in FIGS. 18 and 21, span adjusting can be carried out during operation without temporarily stopping the apparatus to provide a measuring apparatus with enhanced working characteristics.

Futhermore, although the mechanism capable of lifting a plurality of reference weights 2 or 22, 22' in unison has been used for explaining the adjusting methods shown in FIGS. 18-22, such span adjusting methods do not preclude the use of other mechanisms. The methods may be applicable to a mechanism lifting reference weights, individually as, for example, that shown in FIG. 1.

Moreover, although the measuring apparatus has been explained, which has a plurality of measuring hoppers as a sole object for selecting the combination of measured values, the apparatus may be provided with storing hoppers for every one of the measuring hoppers for temporarily storing the product measured by the measuring hoppers, the storing hoppers taking part in selecting the combination together with the measuring hoppers.

What is claimed is:

1. In a measuring apparatus including a distributing table for transferring and distributing product to be measured, a plurality of measuring hoppers arranged about a circumference of the distributing table for receiving therein the product on the distributing table, measuring means for measuring the transferred product in the hoppers, and computer means for selecting a plurality of measuring hoppers whose weight of product accommodated therein is substantially equal to a set weight to exhaust the measured product from the hoppers, the improvement comprising a span adjusting mechanism having at least one member engaging with a respective reference weight arranged in the proximity of a respective one of each of said measuring means to place or remove all said reference weights in unison onto or from said measuring means.

2. A span adjusting mechanism as set forth in claim 1, wherein said distributing table comprises elongated distributing plates respectively transferring said product to be measured in opposite directions, and a plurality of carrying-in troughs are arranged side by side with suitable intervals on both sides of said distributing plates, under end ports of said carrying-in troughs are arranged pool hoppers and further therebelow said measuring hoppers are arranged.

3. A span adjusting mechanism as set forth in claim 1, wherein said member for operating said reference weights is arranged on each side of said distributing table, and each member comprises a lifting plate for hanging knobs of said reference weights, springs for upward biasing of said lifting plate, and solenoids for lowering said lifting plate.

4. A span adjusting mechanism as set forth in claim 3, wherein said member for operating said reference weights comprises a rotatably pivoted shaft extending in a longitudinal direction of said distributing table, a plurality of hanging members extending from said shaft and suspending therefrom said knobs of said reference weights, at least one driving rod extending from said shaft in a direction opposite to the hanging members, a spring for urging said driving rod upward, and a solenoid for lowering said driving rod.

5. A span adjusting mechanism as set forth in claim 1, wherein said distributing table is conically-shaped and about which circumference are radially arranged a plurality of carrying-in troughs, under end ports of which troughs are arranged pool hoppers and therebelow said measuring hoppers are arranged.

6. A span adjusting mechanism as set forth in claim 5, wherein said member for operating said reference weights comprises an annular member engaging with hanging eyes extending from the respective reference weights, a ring member arranged inside of said annular member, a solenoid for lifting said ring member, and levers connecting said ring member and said annular member.

7. A span adjusting mechanism as set forth in claim 5, wherein said member for operating said reference weights comprises a ring member arranged inside of a circle in which said reference weights are arranged, a solenoid for lifting said ring member, and levers extending from said ring member to said reference weights and engaging with upper surfaces of said reference weights.

8. A zero point correcting method for a measuring apparatus including a distributing table for transferring and distributing product to be measured, a plurality of measuring hoppers arranged about a circumference of the distributing table for receiving therein the product on the distributing table, measuring means for measuring the transferred product in the hoppers, and computer means for selecting a plurality of measuring hoppers whose weight of product accommodated therein is substantially equal to a set weight to exhaust the measured product from the hoppers, said method comprising the steps of measuring said measuring hoppers filled with said product by means of said measuring means, memorizing output data from an A/D converter receiving the measured value from the measuring means, again measuring the weight of the measuring hoppers filled with the product under the same condition as in the first measuring step after a lapse of a predetermined time, subtracting the output data from the first measuring step and output data of the second measuring step to determine the difference therebetween to detect any change in zero point, and when a change is detected, adding or subtracting said difference to or from said zero point in a zero point register to correct it.

9. A span adjusting method for a measuring apparatus including a distributing table for transferring and distributing product to be measured, a plurality of measuring hoppers arranged about a circumference of the distributing table for receiving therein the product on the distributing table, measuring means for measuring the transferred product in the hoppers, and computer means for selecting a plurality of measuring hoppers whose weight of product accommodated therein is substantially equal to a set weight so as to exhaust the measured product from the hoppers, said method comprising automatically adjusting a span after product has been exhausted from the measuring hopper selected for the combination of said measured values by opening the bottom plate thereof.

10. A span adjusting method as set forth in claim 9, wherein said method comprises steps of performing the arithmetic operation of $n=(Y_o-m)/X_o$ in a central processing unit after loading reference weights onto said measuring means to obtain a span constant n, and substituting said constant n into an equation $X=(Y-m)/n$ in said central processing unit, where m is the output under a no-load (initial load) condition of the measuring means, $X_o$ is the weight of the measuring means, $Y_o$ is the output of the measuring means under the $X_o$-loaded condition, X is the weight of product to be measured, and Y is the output of the measuring means under the X-loaded condition.

11. A span adjusting method as set forth in claim 9, wherein said method comprises automatically rotating a span adjusting volume to a determined value by a pulse motor under control of a central processing unit under a loaded condition of said measuring means by the reference weights.

12. A span adjusting method as set forth in claim 9, wherein said method is carried out when said measuring hoppers selected for the combination of measured values are opened and closed after a key switch for span adjusting is turned on.

13. A span adjusting method as set forth in claim 9, wherein said method is carried out when said measuring hoppers selected for the combination of measured values are opened and closed after a predetermined time of a timer connected to a central processing unit lapses.

14. A span adjusting method as set forth in claim 9, wherein said method is carried out when said measuring hoppers selected for the combination of measured values are opened and closed after a counter counts a predetermined count number.

15. A span adjusting method as set forth in claim 9, wherein said method is carried out when said measuring hoppers selected for the combination of measured values are opened and closed after the room temperature detected by a temperature sensor reaches a predetermined temperature.

16. A span adjusting method for a measuring apparatus including a distributing table for transferring and distributing product to be measured, a plurality of measuring hoppers arranged about a circumference of the distributing table for receiving therein the product on the distributing table, measuring means for measuring the transferred product in the hoppers, and computer means for selecting a plurality of measuring hoppers whose weight of product accommodated therein is substantially equal to a set weight to exhaust the measured product from the hoppers, said span adjusting method comprising automatically adjusting a span of measuring means which is not selected for the combination of measured values.

17. A span adjusting method as set forth in claim 16, wherein said method comprises the steps of performing the arithmetic operation of $n=(Y_1-Y_2)/X_O$ in a central processing unit after loading reference weights onto the measuring means of the measuring hoppers filled with the product to obtain a span constant n, and substituting said constant n into an equation $X=(Y-m)/n$ in said central processing unit, where $Y_1$ is the output of the measuring means under a loaded condition by the weight $X_1$ of product in a measuring hopper, $X_o$ is the weight of reference weight, $X_2=X_1+X_o$, $Y_2$ is the output of the measuring means under $X_2$ load conditions, and m is the output of the measuring means under a no-load condition.

18. A span adjusting method as set forth in claim 16, wherein said method is carried out on at least one measuring means of at least one measuring hopper which has not been selected for the combination of measured values after a key switch for span adjusting is turned on.

19. A span adjusting method as set forth in claim 16, wherein said method is carried out on at least one measuring means of at least one measuring hopper which has not been selected for the combination of measured values after the lapse of a predetermined time established by a timer connected to a central processing unit.

20. A span adjusting method as set forth in claim 16, wherein said method is carried out on at least one measuring means of at least one measuring hopper which has not been selected for the combination of measured values after a counter counts a predetermined count number.

21. A span adjusting method as set forth in claim 16, wherein said method is carried out on at least one measuring means of at least one measuring hopper which has not been selected for the combination of measured values after the room temperature detected by a temperature sensor reaches a predetermined temperature.

* * * * *